United States Patent
Takakura

(10) Patent No.: US 11,403,039 B2
(45) Date of Patent: Aug. 2, 2022

(54) STORAGE CONTROL DEVICE, STORAGE DEVICE, AND NON-TRANSITORY COMPUTER-READABLE STORAGE MEDIUM FOR STORING DETERMINATION PROGRAM

(71) Applicant: FUJITSU LIMITED, Kawasaki (JP)

(72) Inventor: Atsushi Takakura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 30 days.

(21) Appl. No.: 17/015,127

(22) Filed: Sep. 9, 2020

(65) Prior Publication Data
US 2021/0089235 A1 Mar. 25, 2021

(30) Foreign Application Priority Data
Sep. 20, 2019 (JP) .............................. JP2019-171390

(51) Int. Cl.
*G06F 3/06* (2006.01)

(52) U.S. Cl.
CPC .......... *G06F 3/0659* (2013.01); *G06F 3/0604* (2013.01); *G06F 3/0635* (2013.01); *G06F 3/0664* (2013.01); *G06F 3/0689* (2013.01)

(58) Field of Classification Search
CPC .... G06F 3/0659; G06F 3/0604; G06F 3/0635; G06F 3/0664; G06F 3/0689; G06F 3/0614; G06F 3/067
See application file for complete search history.

(56) References Cited

U.S. PATENT DOCUMENTS

2006/0143332 A1* 6/2006 Yagi ...................... G06F 3/0614
710/38
2006/0271758 A1 11/2006 Innan et al.
2010/0250873 A1 9/2010 Fujii et al.

FOREIGN PATENT DOCUMENTS

JP 2006-330895 A 12/2006
JP 2010-238131 A 10/2010

* cited by examiner

*Primary Examiner* — Ernest Unelus
(74) *Attorney, Agent, or Firm* — Fujitsu Patent Center

(57) ABSTRACT

A storage control device includes: a memory configured to store program instructions; and processor circuitry configured to execute the program instruction stored in the memory, the program instruction including: executing a drive path information storage processing configured to cause the memory to store, for each virtual drive, priority information indicating priority to be selected as a path to access the respective virtual drive for each storage control device, the each storage control device being configured to control a corresponding storage device; and executing a determination processing configured to determine a responsible storage control device by using information of virtual drives included in the virtual RAID group and priority information stored in the memory, the responsible storage control device being the storage control device to be used to access a virtual redundant array of inexpensive disks (RAID) group.

11 Claims, 17 Drawing Sheets

FIG. 4

| VIRTUAL DRIVE NUMBER |
|---|
| #0 |
| #1 |
| #2 |
| ... |
| #N |

| CONTROLLER NUMBER | PASS INFORMATION |
|---|---|
| #0 | RECOMMENDED |
| #1 | NON-RECOMMENDED |
| ... | ... |
| #M | NO PATH |

FIG. 5

| CONTROLLER NUMBER | PROCESSING CAPABILITY | CURRENT PROCESSING VALUE | EXCESS VALUE | ERROR CORRECTION |
|---|---|---|---|---|
| #0 | 1024 | 940 | 0 | 128 |
| #1 | ... | ... | ... | ... |
| ... | | | | |
| #M | | | | |

FIG. 6

| VIRTUAL RAID GROUP NUMBER | RECOMMENDED CONTROLLER NUMBER | RESPONSIBLE CONTROLLER NUMBER | SCORE |
|---|---|---|---|
| #0 | #0 | #0 | 3 |
| #1 | #1 | #1 | 2 |
| #2 | #0 | #2 | 1 |
| ... | ... | ... | ... |
| #L | #2 | #2 | 2 |

STORAGE CONTROL DEVICE, STORAGE DEVICE, AND NON-TRANSITORY COMPUTER-READABLE STORAGE MEDIUM FOR STORING DETERMINATION PROGRAM

CROSS-REFERENCE TO RELATED APPLICATION

This application is based upon and claims the benefit of priority of the prior Japanese Patent Application No. 2019-171390, filed on Sep. 20, 2019, the entire contents of which are incorporated herein by reference.

FIELD

The embodiment discussed herein is related to a storage control device, a storage device, and a non-transitory computer-readable storage medium for storing a determination program.

BACKGROUND

As a storage system that stores data and the like used by a computer, a storage virtualization system that virtualizes (integrally manages) and uses a storage is used. FIG. 16 is a diagram for explaining the storage virtualization system. In FIG. 16, a local storage 91 and an external storage 2 are storage devices, and a business server 3 is a computer that performs business processing.

As illustrated in FIG. 16, the local storage 91 has a controller 90 and a hard disk drive (HDD) 92. The external storage 2 has a controller 2b and an HDD 2c. Note that the local storage 91 and the external storage 2 may have a solid state drive (SSD) instead of an HDD.

In the storage virtualization system, the local storage 91 is assigned to the business server 3. Furthermore, a logical unit (LU) of the external storage 2 is assigned to the local storage 91, and the external storage 2 is treated as a disk equivalent to the local storage 91.

The local storage 91 and the external storage 2 are connected by two paths. Access paths to the LU of the external storage 2 include a recommended path that is normally used (path with first priority) and a non-recommended path (path with second priority) that is used when a failure occurs in a recommended path.

Note that there is a conventional technique that improves processing performance of a storage system by making it possible to share an external volume by a plurality of virtualization storage devices that is each capable of virtualizing and using the external volume. In this conventional technique, a first virtualization storage device virtualizes and takes in the external volume included in the external storage device, and provides it to the host as if it were an internal volume. When the load of the first virtualization storage device increases, a second virtualization storage device is newly introduced and connected to the storage system. When a migration instruction is issued from a management terminal, an external volume related to a selected logical volume ID is transferred from the first virtualization storage device to the second virtualization storage device.

Furthermore, as a conventional technique, there is a management device that manages a storage device and searches for a real storage to be transferred across a storage pool in consideration of the following, to thereby efficiently utilize the storage capacity. This management device, when performing the search described above, considers a storage capacity of a real storage that physically exists, a responsible controller responsible for access control of the real storage, a storage capacity of a virtual storage logically set in the real storage, and a destination of migration of data in the virtual storage.

Examples of the related art include Japanese Laid-open Patent Publication No. 2006-330895, and Japanese Laid-open Patent Publication No. 2010-238131.

SUMMARY

According to an aspect of the embodiments, an apparatus includes A storage control device includes: a memory configured to store program instructions; and processor circuitry configured to execute the program instruction stored in the memory, the program instruction including: executing a drive path information storage processing configured to cause the memory to store, for each virtual drive, priority information indicating priority to be selected as a path to access the respective virtual drive for each storage control device, the each storage control device being configured to control a corresponding storage device; and executing a determination processing configured to determine a responsible storage control device by using information of virtual drives included in the virtual RAID group and priority information stored in the memory, the responsible storage control device being the storage control device to be used to access a virtual redundant array of inexpensive disks (RAID) group.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of a virtual drive information storage unit;

FIG. 5 is a diagram illustrating an example of a processing information storage unit;

FIG. 6 is a diagram illustrating an example of a responsibility information storage unit;

DESCRIPTION OF EMBODIMENT(S)

When the external storage 2 is used, in a slicing environment where a single LU is used as it is, a recommended path may be determined based on the external storage 2 where the LU is present. However, in a mirror configuration (Redundant Arrays of Inexpensive Disks (RAID) 1) or a stripe configuration (RAID 0) in which two external storages 2 are used in combination, there is a problem that it is not possible to determine the recommended path.

Figure 17:
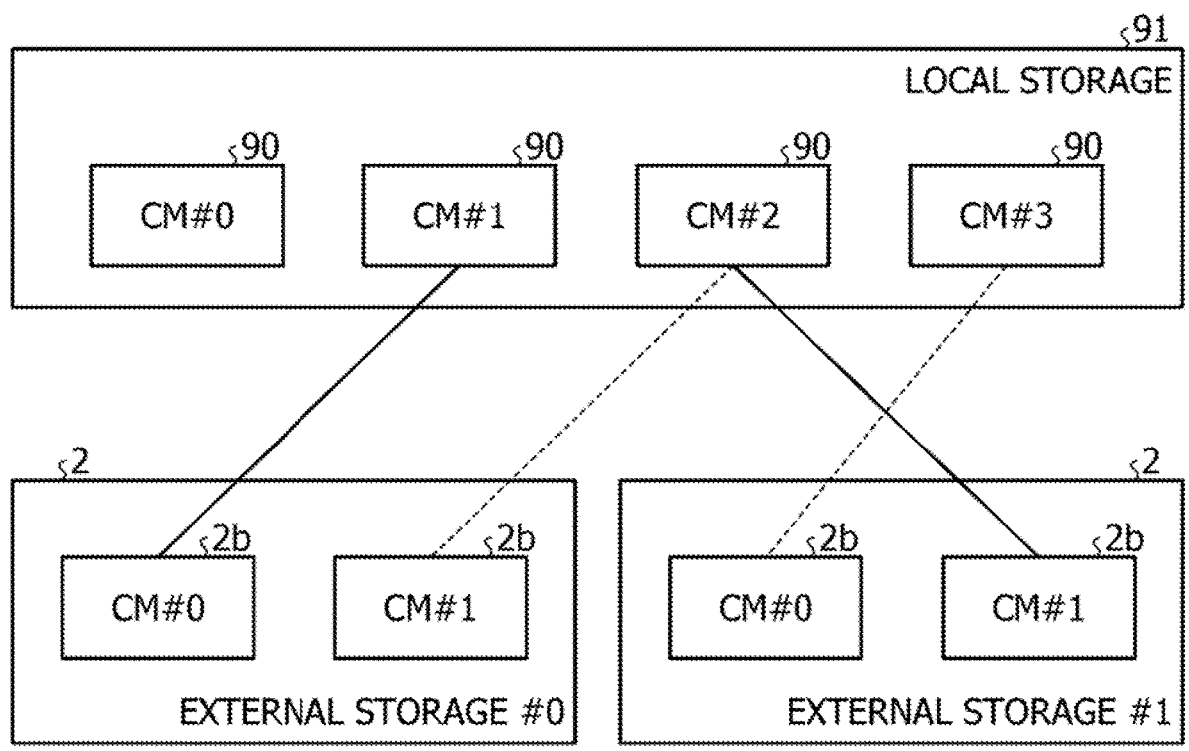
FIG. 17 is a diagram illustrating an example in which it is not possible to determine a recommended path in a mirror configuration or a stripe configuration in which two external storages are used in combination.
Figure 17:
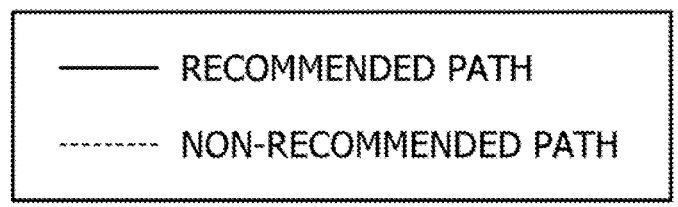

FIG. 17 is a diagram illustrating an example in which it is not possible to determine the recommended path in the mirror configuration or the stripe configuration in which two external storages 2 are used in combination. In FIG. 17, the local storage 91 is connected to two external storages 2 represented by an external storage #0 and an external storage #1. The local storage 91 has four controllers 90 represented by controller modules (CM) #0 to CM #3. An external storage 2 has two controllers 2b represented by CM #0 and CM #1.

As illustrated in FIG. 17, in the local storage 91, CM #1 is a recommended path for the external storage #0, and CM #2 is a recommended path for the external storage #1. Thus, when using the external storage #0 and the external storage #1 in combination, the local storage 91 is not possible to determine which of CM #1 and CM #2 is the recommended path. Note that CM #1 being a recommended path means that an access path controlled by the CM #1 is the recommended path.

According to an aspect of the embodiment, provided is a solution to determine a responsible storage control device when a plurality of drives of a plurality of external storages 2 is combined and used in a redundant manner.

Hereinafter, embodiments of a storage control device, a storage device, and a determination program disclosed by the present application will be described in detail with reference to the drawings. Note that the embodiments do not limit the technology disclosed.

EMBODIMENT

Figure 1:
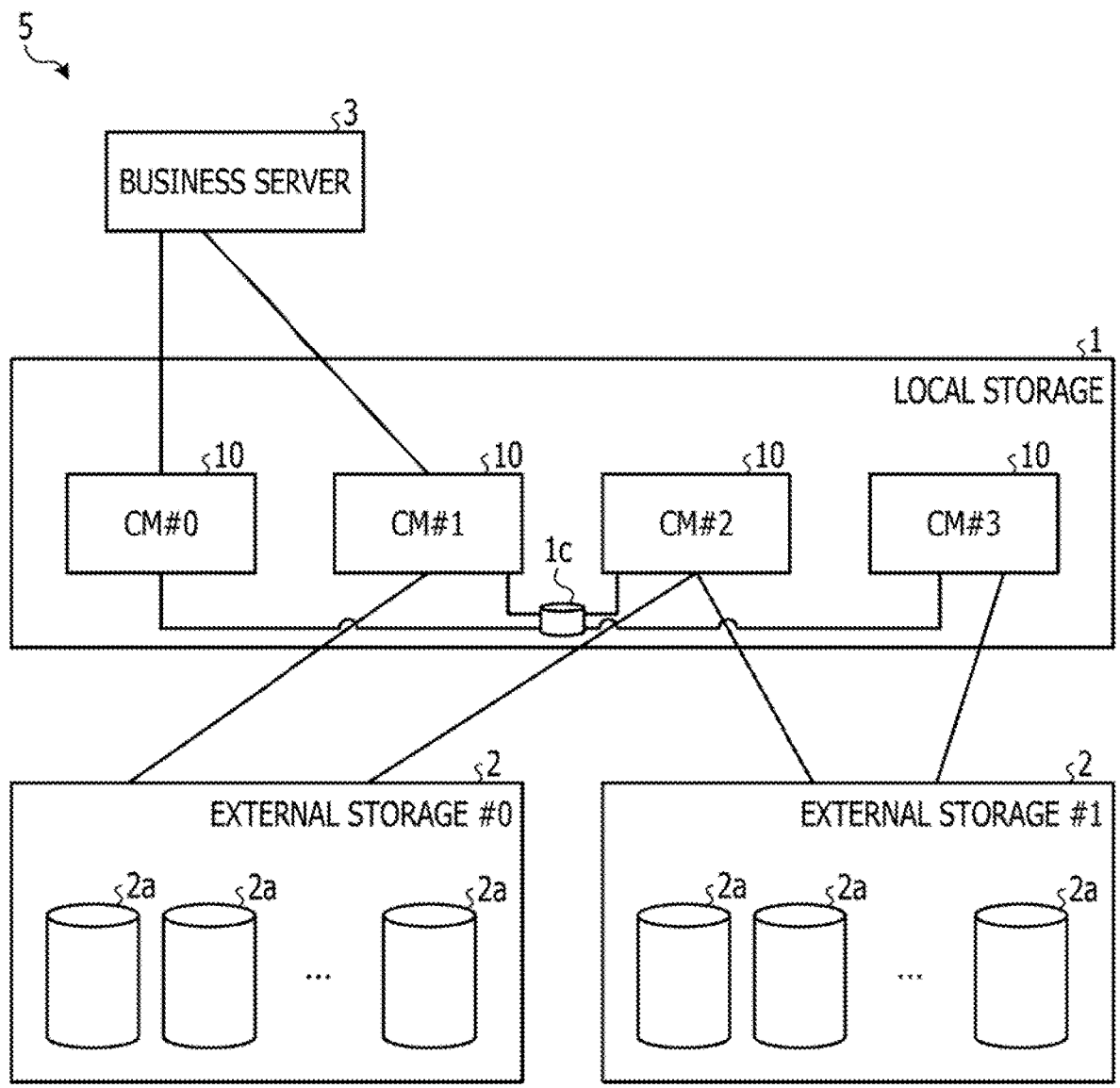
FIG. 1 is a diagram illustrating a configuration of a storage system according to an embodiment.

First, a configuration of the storage system according to an embodiment will be described. FIG. 1 is a diagram illustrating a configuration of a storage system according to the embodiment. As illustrated in FIG. 1, a storage system 5 according to the embodiment has a local storage 1 and two external storages 2 represented by an external storage #0 and an external storage #1. Note that the storage system 5 according to the embodiment may have more than two external storages 2.

The local storage 1 is a storage device assigned to a business server 3. The local storage 1 has four controllers 10 represented by CM #0 to CM #3 and an HDD 1c. The controllers 10 are control devices that control the local storage 1. The HDD 1c is a non-volatile storage device that stores data used by the business server 3. The business server 3 is connected to CM #0 and CM #1. Note that the local storage 1 may have a number of controllers 10 other than four. Furthermore, the local storage 1 may have a plurality of HDDs 1c.

The external storage 2 is a storage device treated as a disk equivalent to the local storage 1. The external storage 2 provides a plurality of external volumes 2a to the local storage 1 when the storage system 5 is virtualized and used. Here, the external volume 2a is a logical unit (LU) provided from the external storage 2 to the local storage 1. The external volume 2a is implemented by the HDD 2c.

The external storage 2 is connected to a part of the controllers 10. In FIG. 1, as an example, the external storage #0 is connected to CM #1 and CM #2, and the external storage #1 is connected to CM #2 and CM #3.

Figure 2:
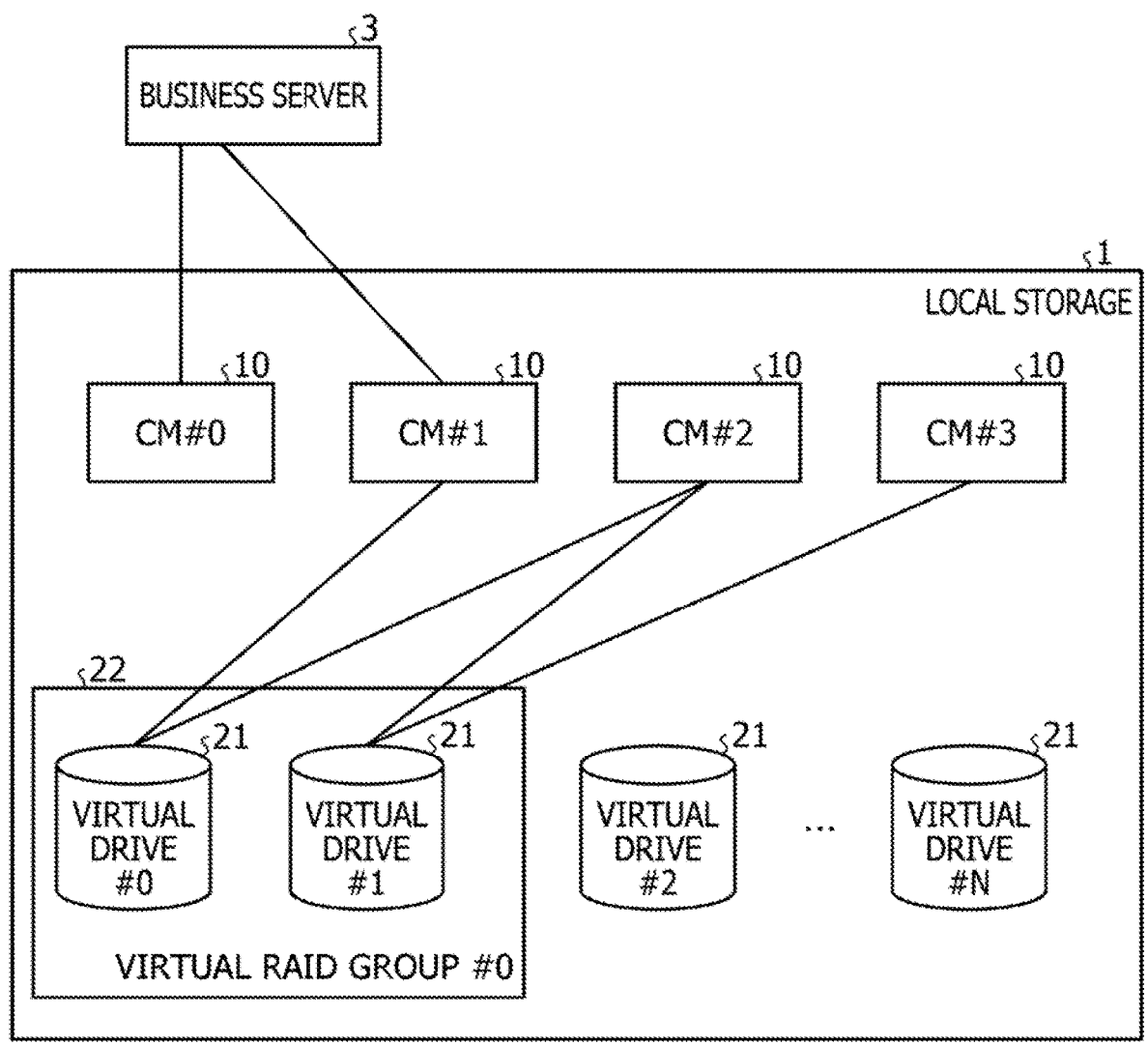
FIG. 2 is a diagram illustrating a configuration of a local storage when the storage system is virtualized and used.

FIG. 2 is a diagram illustrating a configuration of the local storage 1 when the storage system 5 is virtualized and used. As illustrated in FIG. 2, when the storage system 5 is virtualized and used, the local storage 1 has CM #0 to CM #3 and a plurality of virtual drives 21 represented by virtual drives #0 to #N.

The virtual drives 21 are drives that virtually take in the external volumes 2a provided by the external storage 2. The virtual drives 21 are connected to the controllers 10 based on the controllers 10 to which the external storage 2 provided with the external volumes 2a is connected.

For example, the virtual drive #0 includes the external volumes 2a provided from the external storage #0, and is connected to CM #1 and CM #2. The virtual drive #1 includes the external volumes 2a provided from the external storage #1 and is connected to CM #2 and CM #3.

A virtual RAID group 22 is created by combining virtual drives 21. In FIG. 2, the virtual RAID group 22 is created by combining the virtual drives #0 and #1.

Figure 3:
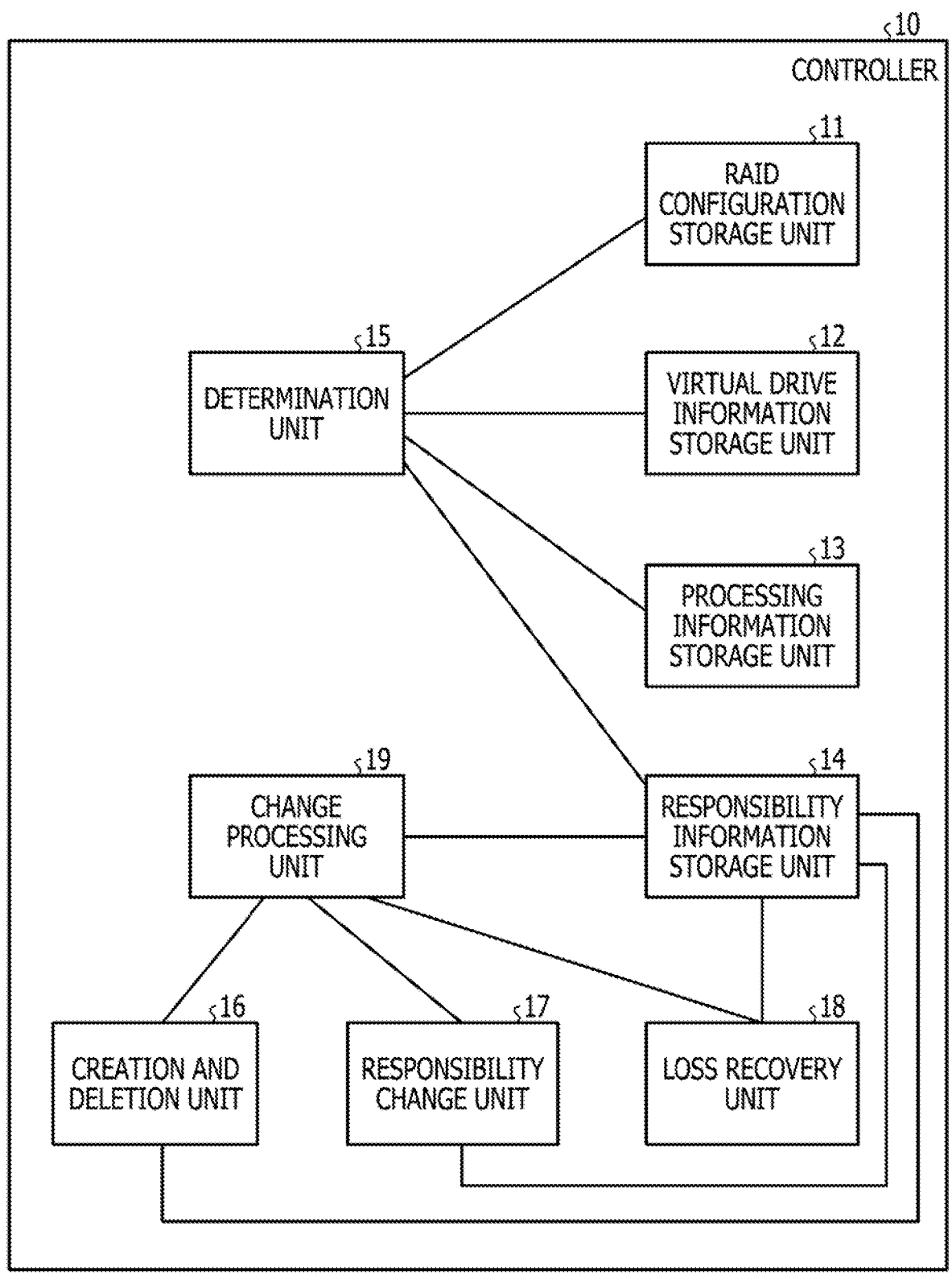
FIG. 3 is a diagram illustrating a functional configuration of a controller.

Next, a functional configuration of the controllers 10 will be described. FIG. 3 is a diagram illustrating a functional configuration of a controller 10. As illustrated in FIG. 3, the controller 10 has a RAID configuration storage unit 11, a virtual drive information storage unit 12, a processing information storage unit 13, a responsibility information storage unit 14, a determination unit 15, a creation and deletion unit 16, a responsibility change unit 17, a loss recovery unit 18, and a change processing unit 19.

The RAID configuration storage unit 11 stores information on the virtual drives 21 forming the virtual RAID group 22 for every virtual RAID group 22.

The virtual drive information storage unit 12 stores information regarding an access path of the virtual drive 21. The virtual drive information storage unit 12 is created when the virtual drive 21 is created from the external volume 2a. For example, by issuing a "REPORT TARGET PORT GROUPS" command to the external volume 2a, information stored in the virtual drive Information storage unit 12 may be obtained.

FIG. 4 is a diagram illustrating an example of the virtual drive Information storage unit 12. As illustrated in FIG. 4, the virtual drive information storage unit 12 stores path information for every controller 10 for every virtual drive 21. The virtual drive number is a number that identifies the virtual drive 21. The controller number is a number that identifies the controller 10.

The path information is information of the access path to the virtual drive 21 of the controller 10. The path information is "recommended" indicating that the controller 10 is a recommended path (path with first priority), "non-recommended" indicating that the controller 10 is a non-recommended path (path with second priority), or "no path" indicating that the controller 10 has no path to the virtual drive 21.

For example, in the virtual drive #0, the controller #0 is the recommended path, the controller #1 is the non-recommended path, . . . , and the controller #M has no path to the virtual drive 21.

The processing information storage unit 13 stores information regarding processing of the controller 10. FIG. 5 is a diagram illustrating an example of the processing information storage unit 13. As illustrated in FIG. 5, the processing information storage unit 13 stores a controller number, a processing capacity, a current processing value, an excess value, and an error correction for every controller 10 in association with each other.

The processing capacity is the number of LUs that the controller 10 is capable of processing. The current processing value is the number of LUs for which the controller 10 is currently responsible. The excess value is the number of LUs that are not possible to be processed because the processing capacity is exceeded, and is the current processing value−the processing capacity. When the current processing value>the processing capacity, then the excess value>zero, indicating that there is an excess. When the current processing value≤processing capacity, then the excess value≤zero, but in FIG. 5, the excess value is uniformly described as "0" (no excess).

The error correction is a value for correcting the processing capacity when the access path to the virtual drive 21 is lost and when the access path to the virtual drive 21 is recovered. The error correction is determined based on an internal load of the local storage 1 and the configuration of the local storage 1.

For example, the number of LUs that the controller #0 is capable of processing is "1024", the number of LUs that the controller #0 is currently responsible for is "940", and the number of LUs that are not possible to be processed due to exceeding the processing capacity is "0" and the error correction is "128".

The responsibility information storage unit 14 stores information regarding the controller 10 responsible for the virtual RAID group 22. FIG. 6 is a diagram illustrating an example of the responsibility information storage unit 14. As illustrated in FIG. 6, the responsibility information storage unit 14 stores a virtual RAID group number, a recommended controller number, a responsible controller number, and a score in association with each other for every virtual RAID group 22.

The virtual RAID group number is a number that identifies the virtual RAID group 22. The recommended controller number is the number of a recommended controller 10 recommended to be responsible for the virtual RAID group 22. The responsible controller number is the number of a responsible controller 10 responsible for the virtual RAID group 22. When the load of the recommended controller 10 does not exceed the processing capacity, the recommended controller 10 becomes the responsible controller 10.

The score is a value indicating the degree of recommendation of the recommended controller 10. The score is a value obtained by summing values based on the path information stored in every controller 10 by the virtual drive information storage unit 12 for the virtual drives 21 forming the virtual RAID group 22.

For example, when the path information is "recommended", the value based on the path information is "2", and when the path Information is "non-recommended", the value based on the path information is "1". When the path information is "no path", the value based on the path information is "0". When the virtual RAID group 22 includes two virtual drives 21, the score is one of "2"+"2"="4", "2"+"1"="3", "2"+"0"="2", "1"+"1"="2", and "1"+"0"="1".

For example, the recommended controller 10 for the virtual RAID group #0 is the controller #0, the responsible controller 10 is also the controller #0, and the score of the recommended controller 10 is "3".

The determination unit 15 determines the recommended controller and the responsible controller 10 for the virtual RAID group 22 and stores the determined numbers of the recommended controller 10 and the responsible controller 10 in the responsibility information storage unit 14. In other words, the determination unit 15 determines a recommended path and stores information regarding the recommended path in the responsibility information storage unit 14.

Specifically, the determination unit 15 calculates the score of the controller 10 for the virtual RAID group 22 based on the information stored in the RAID configuration storage unit 11 and the information stored in the virtual drive information storage unit 12. For example, it is assumed that the virtual RAID group #0 includes the virtual drive #0 and the virtual drive #1 based on the RAID configuration storage unit 11. Furthermore, based on the virtual drive information storage unit 12, the path information of the controller #0 is "path with first priority (recommended)" for the virtual drive #0 and the path information of the controller #0 is "path with second priority (non-recommended)" for the virtual drive #1. In this case, the score of the controller #0 for the virtual RAID group #0 is "2"+"1"=3.

Then, the determination unit 15 determines the controller 10 having the highest score as the recommended controller 10 for the virtual RAID group 22. When there are multiple controllers 10 having the maximum score, the determination unit 15 determines the controller 10 having the smallest number of virtual RAID groups 22 for which it is responsible as the recommended controller 10.

However, when the virtual RAID group 22 includes two virtual drives 21 and there are multiple controllers 10 having the maximum score of "2", the determination unit 15 determines a controller 10 that has non-recommended paths to the two virtual drives 21, respectively, as the recommended controller 10.

Then, when the excess value is "0", for example, when the recommended controller 10 has an excess processing capacity, the determination unit 15 determines the recommended controller 10 as the responsible controller 10. When the excess value is larger than "0", for example, when the recommended controller 10 does not have the excess processing capacity, the determination unit 15 determines a controller 10 having an excess processing capacity and a maximum score other than the recommended controller 10 as the responsible controller 10.

The creation and deletion unit 16 performs processing related to the responsible controller 10 for the virtual RAID group 22 when an LU is created in the virtual RAID group 22 and when an LU is deleted from the virtual RAID group 22.

Specifically, when an LU is created in the virtual RAID group 22, the creation and deletion unit 16 adds the number of created LUs to the current processing value of the responsible controller 10, and calculates the excess value when the current processing value is larger than the processing capacity. Then, when the difference of the excess value before and after the calculation is larger than a predetermined threshold value, the creation and deletion unit 16 requests the change processing unit 19 to perform processing related to change of the responsible controller 10. The predetermined threshold value is 16 or 32, for example.

Furthermore, when an LU is deleted from the virtual RAID group 22, the creation and deletion unit 16 subtracts the number of deleted LUs from the current processing value of the responsible controller 10, and when the excess value is larger than "O", the creation and deletion unit 16 requests the change processing unit 19 to perform processing related to change of the responsible controller 10. Furthermore, when the excess value is not larger than "0" and the difference of the current processing value before and after the calculation is larger than the predetermined threshold value, the creation and deletion unit 16 requests the change processing unit 19 to perform the processing related to change of the responsible controller 10.

When the responsible controller 10 for the virtual RAID group 22 is changed, the responsibility change unit 17 performs processing related to the responsible controller 10 before and after the change.

Specifically, with respect to the responsible controller 10 before the change, the responsibility change unit 17 subtracts the number of LUs of the virtual RAID group 22 for which it is no longer responsible due to the change from the current processing value. Then, when the excess value is larger than "0", the responsibility change unit 17 requests the change processing unit 19 to perform processing related to change of the responsible controller 10. Furthermore, when the excess value is not larger than "0" and the difference of the current processing value before and after the calculation is larger than the predetermined threshold value, the creation and deletion unit 16 requests the change processing unit 19 to perform the processing related to change of the responsible controller 10.

Furthermore, with respect to the responsible controller 10 after the change, the responsibility change unit 17 adds the number of LUs of the virtual RAID group 22 for which it is newly responsible to the current processing value, and calculates the excess value when the current processing value is larger than the processing capacity. Then, when the difference of the excess value before and after the calculation is larger than the predetermined threshold value, the responsibility change unit 17 requests the change processing unit 19 to perform processing related to change of the responsible controller 10.

When an access path to a virtual drive 21 is lost, the loss recovery unit 18 performs processing related to the controller 10 responsible for the virtual RAID group 22 including the virtual drive 21. Furthermore, when the access path to the virtual drive 21 is recovered, the loss recovery unit 18 performs processing related to the controller 10 responsible for the virtual RAID group 22 including the virtual drive 21.

Specifically, when an access path to a virtual drive 21 is lost, the loss recovery unit 18 decreases the value of the error correction from the processing capacity of the controller 10 responsible for the virtual RAID group 22 including the virtual drive 21. Then, the loss recovery unit 18 calculates the excess value when the current processing value is larger than the processing capacity, and when the difference of the excess value before and after the calculation is larger than a predetermined threshold value, the loss recovery unit 18 requests the change processing unit 19 to perform processing related to change of the responsible controller 10.

Furthermore, when the access path to the virtual drive 21 is recovered, the loss recovery unit 18 adds the value of the error correction to the processing capacity of the controller 10 responsible for the virtual RAID group 22 including the virtual drive 21. Then, when the excess value is larger than "0", the loss recovery unit 18 subtracts the error correction from the excess value, and requests the change processing unit 19 to perform processing related to change of the responsible controller 10.

The change processing unit 19 performs processing related to change of the responsible controller 10. Specifically, the change processing unit 19 changes the responsible controller 10 to the recommended controller 10 in a case where the recommended controller 10 and the responsible controller 10 are different and the recommended controller 10 has a margin. Here, the case where the recommended controller 10 has a margin is a case where the processing capacity of the recommended controller 10 is equal to or larger than a value obtained by adding the number of LUs of the virtual RAID group 22 to the current processing value.

When the responsible controller 10 is changed to the recommended controller 10, the change processing unit 19 subtracts the number of LUs of the virtual RAID group 22 from the current processing value of the responsible controller 10 before the change. Furthermore, when the responsible controller is changed to the recommended controller 10, the change processing unit 19 adds the number of LUs of the virtual RAID group 22 to the current processing value of the responsible controller 10 after the change.

Furthermore, when the responsible controller 10 is changed to the recommended controller 10, if the excess value of the responsible controller 10 before the change is larger than "0", the change processing unit 19 subtracts the number of LUs of the virtual RAID group 22 from the excess value. However, when the excess value becomes negative, the change processing unit 19 sets the excess value to "0".

Next, a flow of processing by the controller 10 will be described with reference to FIGS. 7 to 14. Note that the controller 10 performs the processing illustrated in FIGS. 7 to 14 when operating as a master controller 10.

Figure 7:
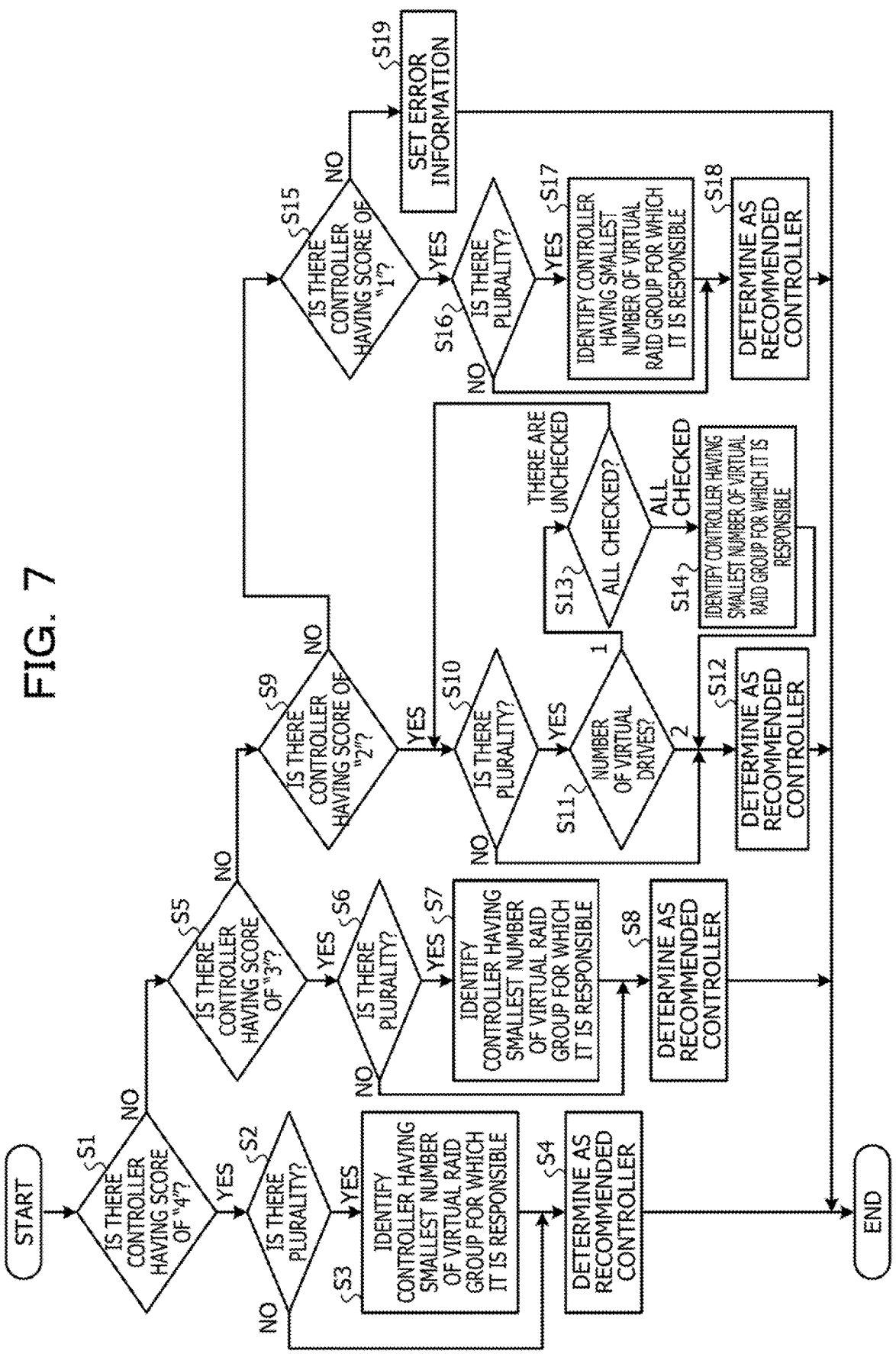
FIG. 7 is a flowchart illustrating a flow of processing for determining a recommended controller.

FIG. 7 is a flowchart Illustrating a flow of processing for determining the recommended controller 10. Note that the processing illustrated in FIG. 7 is performed when the virtual RAID group 22 is created. Furthermore, FIG. 7 illustrates a case where the virtual RAID group 22 includes two virtual drives 21. Furthermore, it is also assumed that the score of each controller 10 has already been calculated for the created virtual RAID group 22.

As illustrated in FIG. 7, the determination unit 15 determines whether or not there is a controller 10 having a score of "4" (step S1) and, when there is, determines whether or not there is a plurality of controllers 10 having a score of "4" (step S2). Then, when there is not a plurality of controllers 10 having a score of "4", the determination unit 15 determines the controller 10 having a score of "4" as the recommended controller 10 (step S4) and sets it in the responsibility information storage unit 14.

On the other hand, when there is a plurality of controllers 10 having a score of "4", the determination unit 15 identifies a controller 10 having a smallest number of the virtual RAID groups 22 for which it is responsible from the plurality of controllers 10 (step S3). Then, the determination unit 15 determines the identified controller 10 as the recommended controller 10 (step S4) and sets it in the responsibility information storage unit 14.

Furthermore, in step S1, when there is no controller 10 having a score of "4", the determination unit 15 determines whether or not there is a controller 10 having a score of "3" (step S5). Then, when there is a controller 10 having a score of "3", the determination unit 15 determines whether or not there is a plurality of controllers 10 having a score of "3"

(step S6). Then, when there is not a plurality of controllers 10 having a score of "3", the determination unit 15 determines the controller 10 having a score of "3" as the recommended controller 10 (step S8) and sets it in the responsibility information storage unit 14.

On the other hand, when there is a plurality of controllers 10 having a score of "3", the determination unit 15 identifies the controller 10 having the smallest number of virtual RAID groups 22 for which it is responsible from the plurality of controllers 10 (step S7). Then, the determination unit 15 determines the specified controller 10 as the recommended controller 10 (step S8) and sets it in the responsibility information storage unit 14.

Furthermore, in step S5, when there is no controller 10 having a score of "3", the determination unit 15 determines whether or not there is a controller 10 having a score of "2" (step S9). Then, when there is a controller 10 having a score of "2", the determination unit 15 determines whether or not there is a plurality of controllers 10 having a score of "2" (step S10). Then, when there is not a plurality of controllers 10 having a score of "2", the determination unit 15 determines the controller 10 having a score of "2" as the recommended controller 10 (step 512) and sets it in the responsibility information storage unit 14.

On the other hand, when there is a plurality of controllers 10 having a score of "2", the determination unit 15 determines the number of virtual drives forming the score (step S11). Then, when the number of virtual drives is "2", the determination unit 15 determines the controller 10 having the number of virtual drives "2" as the recommended controller 10 (step S12) and sets it in the responsibility information storage unit 14.

On the other hand, when the number of virtual drives in the virtual RAID group 22 is "1", the determination unit 15 determines whether or not all of the plurality of controllers 10 have been checked (step S13). Then, when there is an unchecked controller 10, the determination unit 15 returns to step S10 with the unchecked controller 10 being a target. On the other hand, when there is no unchecked controller 10, the determination unit 15 identifies the controller 10 having the smallest number of virtual RAID groups 22 for which it is responsible (step S14), and determines the identified controller 10 as the recommended controller 10 (Step S12). Then, the determination unit 15 sets the recommended controller 10 in the responsibility information storage unit 14.

Furthermore, in step S9, when there is no controller 10 having a score of "2", the determination unit 15 determines whether or not there is a controller 10 having a score of "1" (step S15). Then, when there is a controller having a score of "1", the determination unit 15 determines whether or not there is a plurality of controllers 10 having a score of 1 (step S16). Then, when there is not a plurality of controllers 10 having a score of "1", the determination unit 15 determines the controller 10 having a score of "1" as the recommended controller 10 (step S18) and sets it in the responsibility information storage unit 14.

On the other hand, when there is a plurality of controllers 10 having a score of "1", the determination unit 15 identifies the controller 10 having a smallest number of virtual RAID groups 22 for which it is responsible from the plurality of controllers 10 (step S17). Then, the determination unit 15 determines the identified controller 10 as the recommended controller 10 (step S18) and sets it in the responsibility information storage unit 14.

Furthermore, when there is no controller 10 having a score of "1" in step S15, the determination unit 15 sets error information in the responsibility information storage unit 14 (step S19).

In this manner, the determination unit 15 determines the responsible controller 10 in descending order of score, and thus the controller 10 of the recommended path may be preferentially determined as the responsible controller 10.

Figure 8:
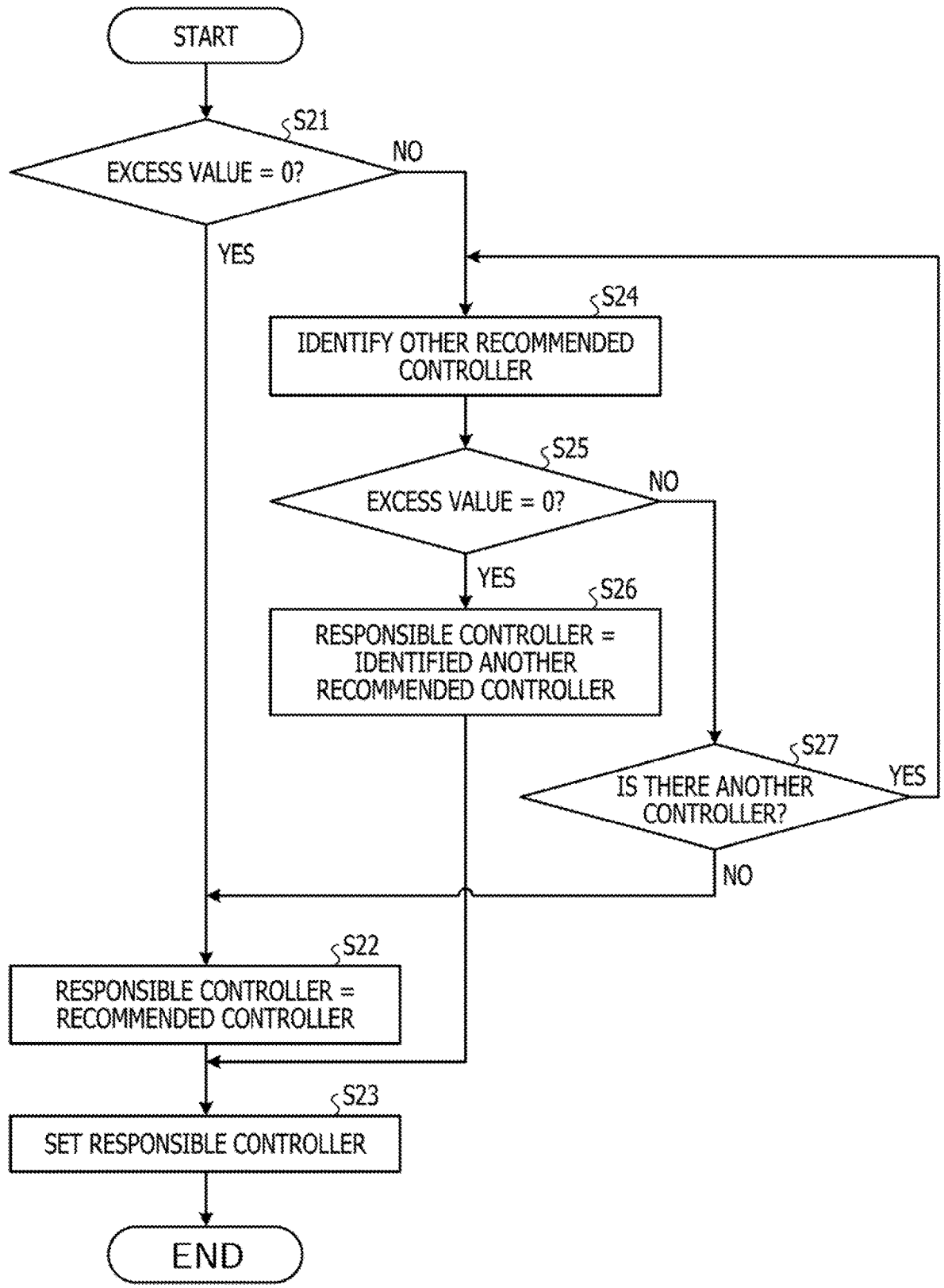
FIG. 8 is a flowchart illustrating a flow of processing for determining a responsible controller.

FIG. 8 is a flowchart illustrating a flow of processing for determining the responsible controller 10. As illustrated in FIG. 8, the determination unit 15 determines whether or not the excess value of the recommended controller 10 is "0" (step S21). When the excess value is "0" (no excess), the recommended controller 10 is determined as the responsible controller 10 (step S22). Then, the determination unit 15 sets the responsible controller 10 in the responsibility information storage unit 14 (step S23).

On the other hand, when the excess value of the recommended controller 10 is larger than "0", the determination unit 15 identifies another recommended controller 10 (step S24). As illustrated in FIG. 7, the determination unit 15 identifies another recommended controller 10 based on the score, the number of virtual RAID groups 22 for which it is responsible, and the number of virtual drives 21.

Then, the determination unit 15 determines whether or not the excess value of the other recommended controller 10 is "0" (step S25) and, when it is "0", determines the identified other recommended controller 10 as the responsible controller 10 (step S26). Then, the determination unit 15 sets the responsible controller 10 in the responsibility information storage unit 14 (step S23).

On the other hand, when the excess value of the other recommended controller 10 is not "0", the determination unit 15 determines whether or not there is another controller 10 (step S27), and moves to step S22 when there is no other controller 10. On the other hand, when there is another controller 10, the determination unit 15 moves to step S24.

In this manner, since the determination unit 15 determines the responsible controller 10 based on the excess value of the recommended controller 10, the responsible controller 10 may be determined based on the load status of the controller 10.

Figure 9:
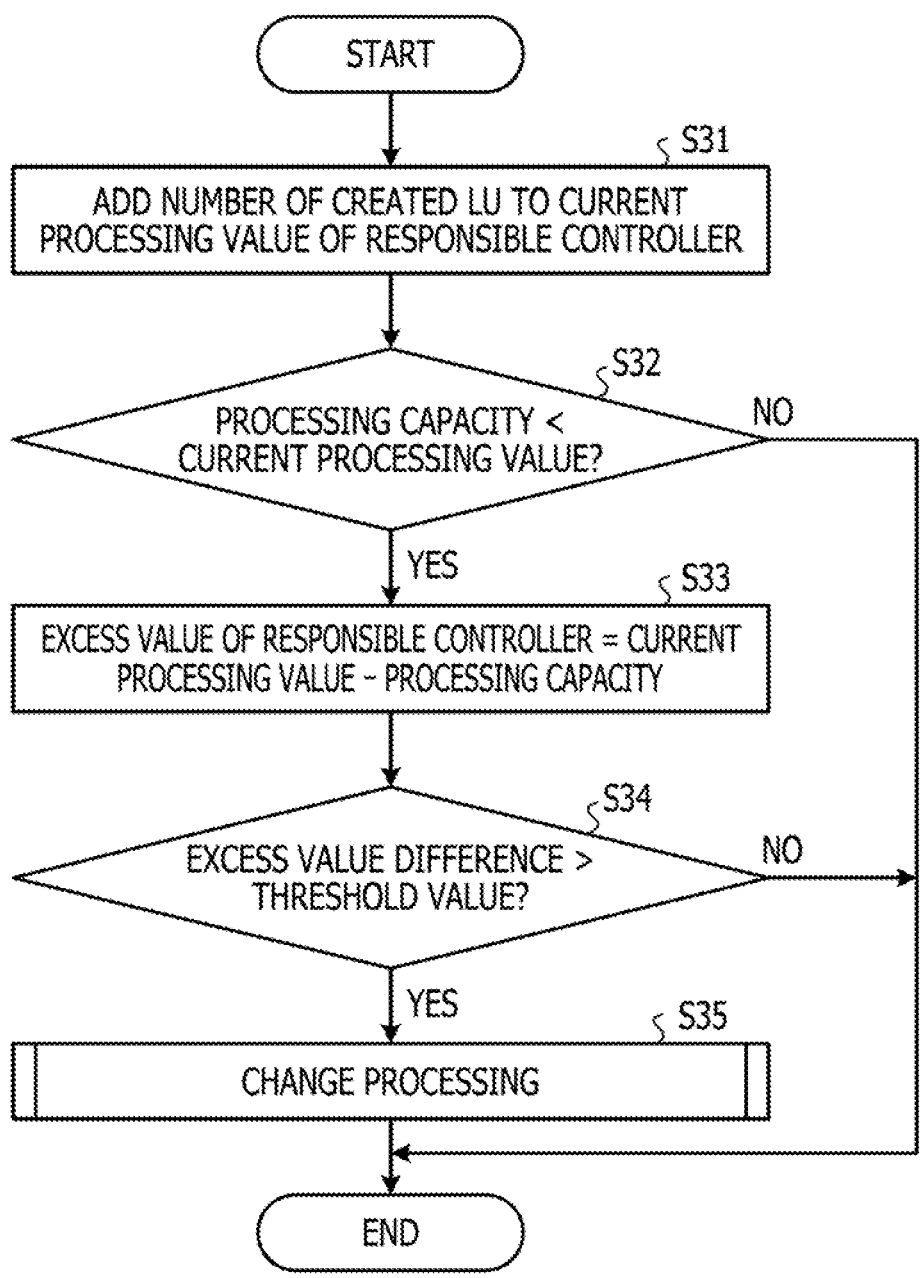
FIG. 9 is a flowchart illustrating a flow of processing when an LU has been created in a virtual RAID group.

FIG. 9 is a flowchart Illustrating a flow of processing when an LU has been created in the virtual RAID group 22. As illustrated in FIG. 9, the creation and deletion unit 16 adds the number of created LUs to the current processing value of the responsible controller 10 that is responsible for the virtual RAID group 22 in which an W has been created (step S31). Then, the creation and deletion unit 16 determines whether or not the current processing value is larger than the processing capacity (step S32), and ends the processing when the current processing value is equal to or smaller than the processing capacity.

On the other hand, when the current processing value is larger than the processing capacity, the creation and deletion unit 16 subtracts the processing capacity from the current processing value of the responsible controller 10 to calculate the excess value (step S33), and determines whether or not an excess value difference before and after the calculation of the excess value is larger than a predetermined threshold value (step S34). Then, when the excess value difference is less than or equal to the predetermined threshold value, the creation and deletion unit 16 ends the processing.

On the other hand, when the excess value difference is larger than the predetermined threshold value, the creation and deletion unit 16 requests the change processing unit 19 to perform change processing that is processing related to change of the responsible controller 10 (step S35).

As described above, when an LU has been created, the creation and deletion unit 16 requests the change processing unit 19 to perform change processing if the excess value difference is larger than the predetermined threshold value, and thus the controller 10 may change the responsible controller upon creation of the LU.

Figure 10:
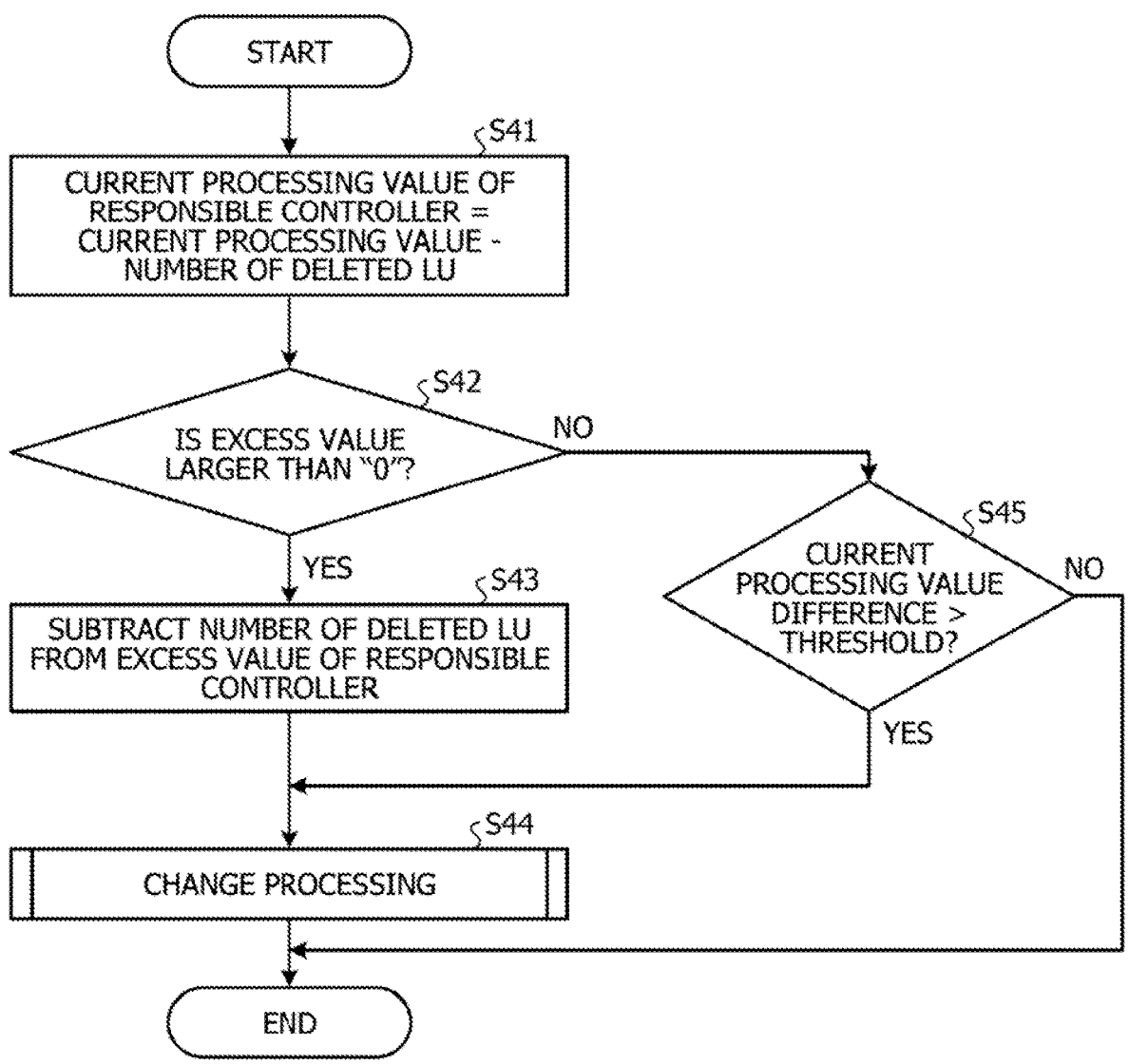
FIG. 10 is a flowchart illustrating a flow of processing when an LU has been deleted from the virtual RAID group.

FIG. 10 is a flowchart illustrating a flow of processing when an LU has been deleted from the virtual RAID group 22. As illustrated in FIG. 10, the creation and deletion unit 16 subtracts the number of deleted LUs from the current processing value of the responsible controller 10 that is responsible for the virtual RAID group 22 in which an LU has been deleted (step S41).

Then, the creation and deletion unit 16 determines whether or not the excess value of the responsible controller 10 is larger than "0" (step S42). When the excess value is larger than "0", the number of deleted LUs is subtracted from the excess value of the responsible controller 10 (step S43). Then, the creation and deletion unit 16 requests the change processing unit 19 to perform change processing (step S44).

On the other hand, when the excess value of the responsible controller 10 is "0", the creation and deletion unit 16 determines whether or not a current processing value difference before and after the subtraction is larger than a predetermined threshold value (step S45), and moves to step S44 when it is larger or ends the processing when it not larger.

In this manner, when an LU has been deleted, the creation and deletion unit 16 requests the change processing unit 19 to perform change processing when the excess value is larger than "0" or when the excess value is "0" and the current processing value difference is larger than the predetermined threshold value. Therefore, the controller 10 may change the responsible controller 10 whose load has decreased.

Figure 11:
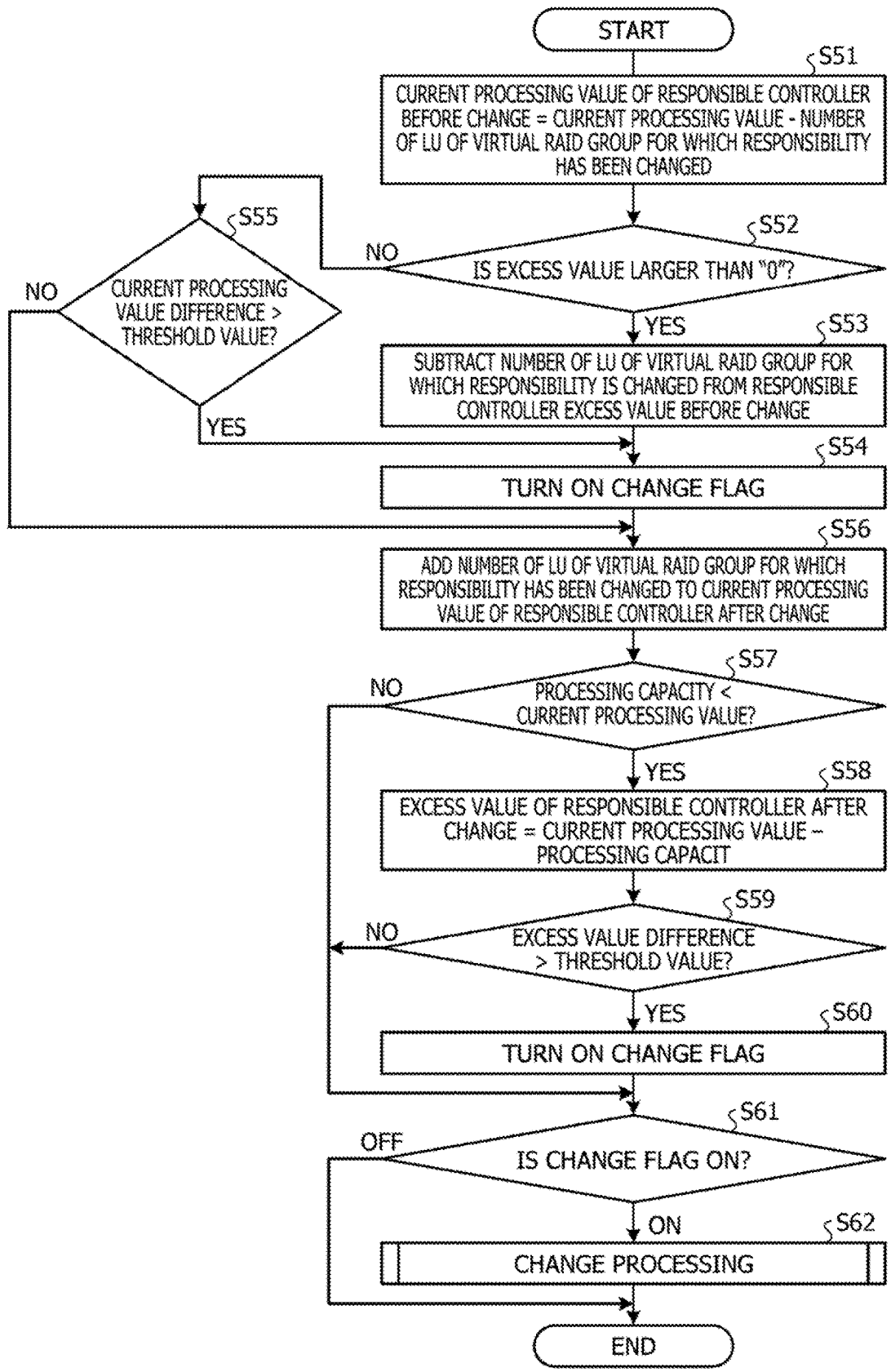
FIG. 11 is a flowchart illustrating a flow of processing when the responsible controller for the virtual RAID group has been changed.

FIG. 11 is a flowchart illustrating a flow of processing when the responsible controller 10 for the virtual RAID group 22 has been changed. As illustrated in FIG. 11, the responsibility change unit 17 subtracts the number of LUs of the virtual RAID group 22 for which responsibility has been changed from the current processing value of the responsible controller 10 before the change (step S51).

Then, the responsibility change unit 17 determines whether or not the excess value of the responsible controller 10 before the change is larger than "0" (step S52). Then, when it is larger than "0", the responsibility change unit 17 subtracts the number of LUs of the virtual RAID group 22 for which responsibility has been changed from the excess value of the responsible controller 10 before the change (step S53). Then, the responsibility change unit 17 turns on a change flag (step S54), and moves to step S56.

On the other hand, when the excess value of the responsible controller 10 before the change is "0", the responsibility change unit 17 determines whether or not a current processing value difference before and after the subtraction is larger than a predetermined threshold value (step S55). Then, the responsibility change unit 17 moves to step S54 when the current processing value difference before and after the subtraction is larger than the predetermined threshold value, or moves to step S56 when the current processing value difference before and after the subtraction is not larger than the predetermined threshold value.

Then, the responsibility change unit 17 adds the number of LUs of the virtual RAID group 22 for which responsibility has been changed to the current processing value of the responsible controller 10 after the change (step S56). Then, the responsibility change unit 17 determines whether or not the current processing value is larger than the processing capacity (step S57), and moves to step S61 when the current processing value is not larger than the processing capacity.

On the other hand, when the current processing value is larger than the processing capacity, the responsibility change unit 17 subtracts the processing capacity from the current processing value of the responsible controller 10 after the change to calculate the excess value (step S58). Then, the responsibility change unit 17 determines whether or not an excess value difference before and after the calculation of the excess value is larger than a predetermined threshold value (step S59). Then, the responsibility change unit 17 moves to step S61 when the excess value difference is not larger than the predetermined threshold value, or turns on the change flag when the excess value difference is larger than the predetermined threshold value (step S60).

Then, the responsibility change unit 17 determines whether or not the change flag is on (step S61), and requests the change processing unit 19 to perform change processing when it is on (step S62).

In this manner, the responsibility change unit 17 requests the change processing unit 19 to perform change processing when the excess value of the responsible controller 10 before the change is larger than "0" or when the excess value is not larger than "0" and the current processing value difference is larger than the predetermined threshold value. Therefore, the responsibility change unit 17 may change the responsible controller 10 when the load decreases due to the change of the LU. Furthermore, when the excess value difference of the responsible controller 10 after the change is larger than the predetermined threshold value, the controller 10 requests the change processing unit 19 to perform change processing, and thus the controller 10 may change the responsible controller 10 upon change of responsibility for the LU.

Figure 12:
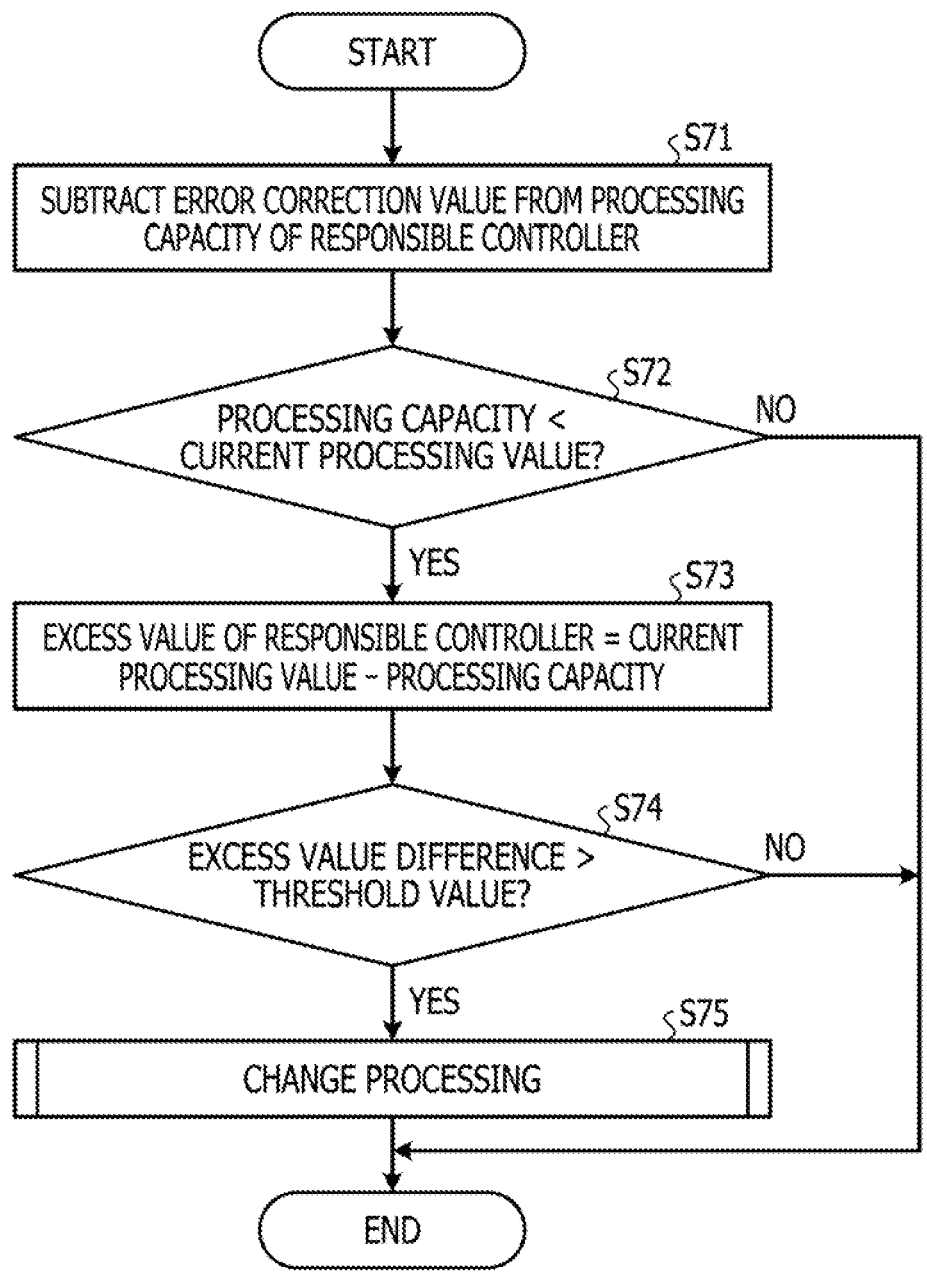
FIG. 12 is a flowchart illustrating a flow of processing when an access path to a virtual drive has been lost.

FIG. 12 is a flowchart illustrating a flow of processing when the access path to the virtual drive 21 has been lost. As illustrated in FIG. 12, the loss recovery unit 18 subtracts the error correction value from the processing capacity of the responsible controller 10 (step S71). Here, the responsible controller 10 is the responsible controller 10 for the virtual RAID group 22 including the virtual drive 21 whose access path has been lost. Then, the loss recovery unit 18 determines whether or not the current processing value is larger than the processing capacity (step S72), and ends the processing when the current processing value is not larger than the processing capacity.

On the other hand, when the current processing value is larger than the processing capacity, the loss recovery unit 18 subtracts the processing capacity from the current processing value of the responsible controller 10 to calculate the excess value (step S73), and determines whether or not an excess value difference before and after the calculation of the excess value is larger than a predetermined threshold value (step S74). Then, the loss recovery unit 18 ends the process when the excess value difference is not larger than the predetermined threshold value, or requests the change processing unit 19 to perform change processing when the excess value difference is larger than the predetermined threshold value (Step S75).

In this manner, when the access path to the virtual drive 21 has been lost, the loss recovery unit 18 may reflect the loss of the access path in the responsible controller 10 by subtracting the error correction value from the processing capacity of the responsible controller 10.

Figure 13:
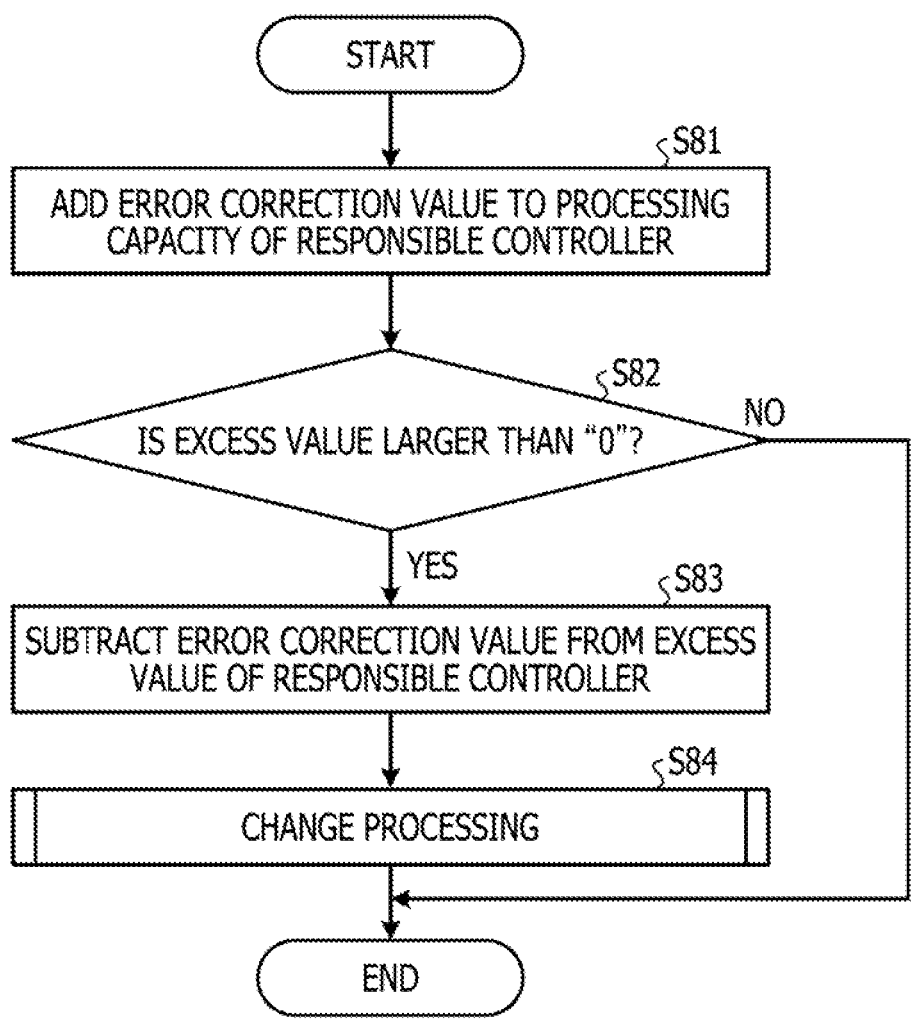
FIG. 13 is a flowchart illustrating a flow of processing when an access path to a virtual drive has been recovered.

FIG. 13 is a flowchart illustrating a flow of processing when the access path to the virtual drive 21 has been recovered. As illustrated in FIG. 13, the loss recovery unit 18 adds the error correction value to the processing capacity of the responsible controller 10 (step S81). Here, the responsible controller 10 is the responsible controller 10 for the virtual RAID group 22 including the virtual drive 21 whose access path has been recovered.

Then, the loss recovery unit 18 determines whether or not the excess value of the responsible controller 10 is larger than "0" (step S82), and ends the processing when it is not larger than "0". On the other hand, when the excess value of the responsible controller 10 is larger than "0", the loss recovery unit 18 subtracts the error correction value from the excess value of the responsible controller 10 (step S83), and requests the change processing unit 19 to perform change processing (step S84).

In this manner, when the access path to the virtual drive 21 has been recovered, the loss recovery unit 18 adds the error correction value to the processing capacity of the responsible controller 10, and thus the loss recovery unit 18 may reflect the recovery of the access path in the responsible controller 10.

Figure 14:
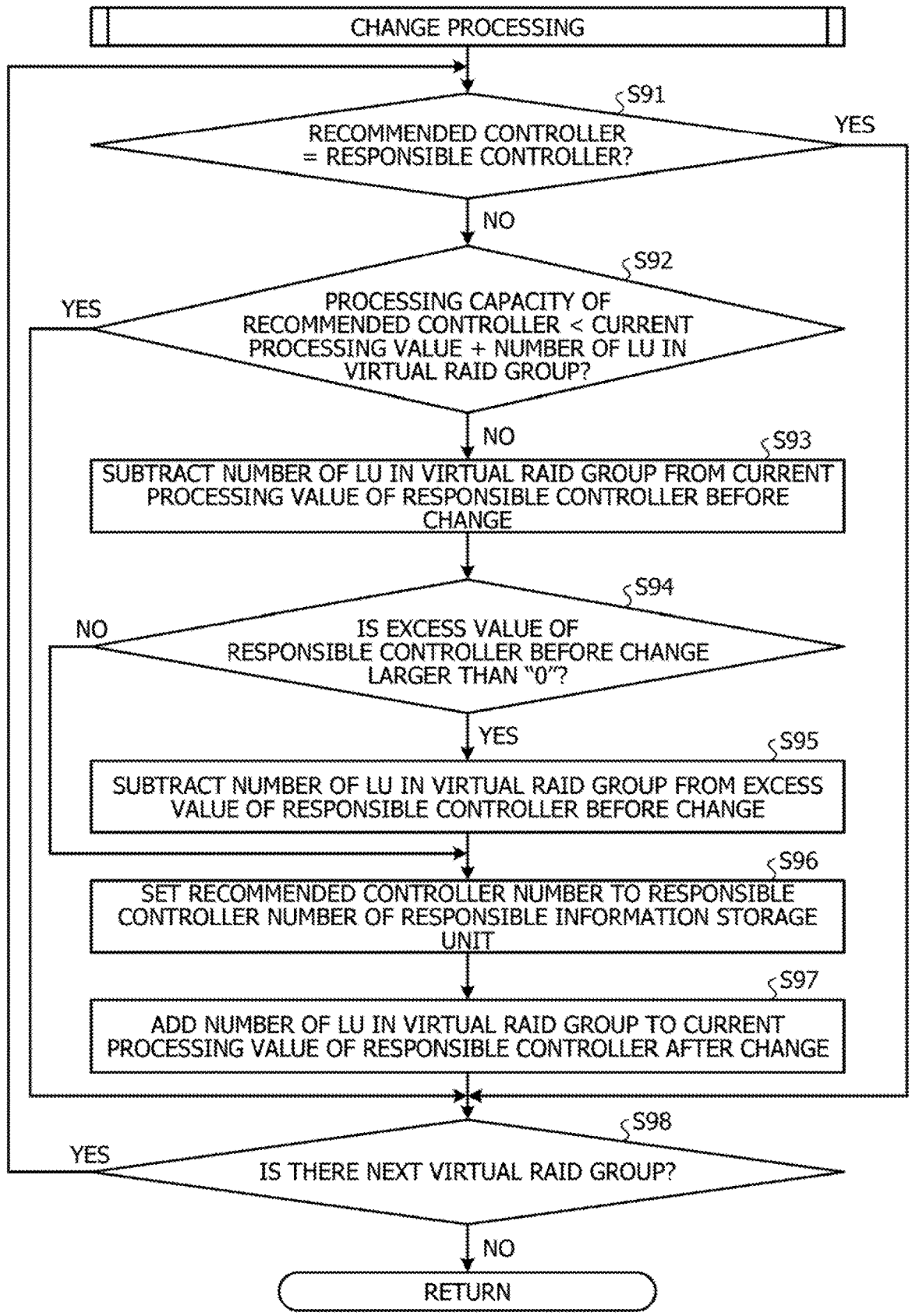
FIG. 14 is a flowchart illustrating a flow of change processing.

FIG. 14 is a flowchart illustrating a flow of change processing. As illustrated in FIG. 14, the change processing unit 19 refers to the responsibility information storage unit 14 from the first virtual RAID group 22 and determines whether or not the recommended controller 10 and the responsible controller 10 are the same (step S91).

Then, when the recommended controller 10 and the responsible controller 10 are not the same, the change processing unit 19 determines whether or not the processing capacity of the recommended controller 10 is smaller than a value obtained by adding the number of LUs in the virtual RAID group 22 to the current processing value (step S92). Then, when the processing capacity of the recommended controller 10 is equal to or larger than the value obtained by adding the number of LUs in the virtual RAID group 22 to the current processing value, the change processing unit 19 subtracts the number of LUs in the virtual RAID group 22 from the current processing value of the responsible controller 10 before the change (step S93).

Then, the change processing unit 19 determines whether or not the excess value of the responsible controller 10 before the change is larger than "0" (step S94). Then, when it is larger than "0", the change processing unit 19 subtracts the number of LUs in the virtual RAID group 22 from the excess value of the responsible controller 10 before the change (step S95). However, when the excess value becomes negative, the change processing unit 19 sets the excess value to "0". Then, the change processing unit 19 sets the recommended controller number to the responsible controller number of the responsibility information storage unit 14 (step S96), and adds the number of LUs in the virtual RAID group 22 to the current processing value of the responsible controller 10 after the change (step S97).

Then, the change processing unit 19 determines whether or not there is a next virtual RAID group 22 (step S98), and returns to step S91 when there is or ends the processing when there is not. Furthermore, when the processing capacity of the recommended controller 10 is smaller than the value obtained by adding the number of LUs in the virtual RAID group 22 to the current processing value in step S92, the change processing unit 19 moves to step S98. Furthermore, when the recommended controller 10 and the responsible controller 10 are the same in step S91, the change processing unit 19 moves to step S98.

In this manner, the change processing unit 19 changes the responsible controller 10 to the recommended controller 10 when the recommended controller 10 and the responsible controller 10 are different and the recommended controller 10 has a margin. Therefore, the local storage 1 may preferentially use the recommended controller 10.

Figure 15:
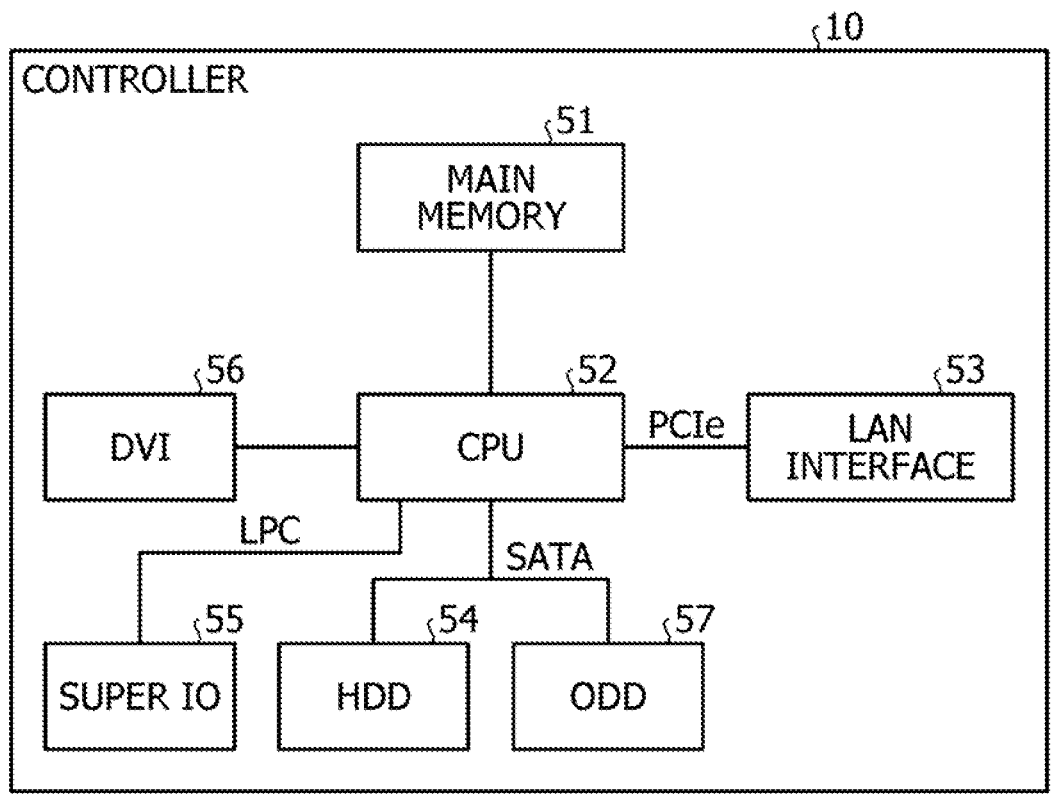
FIG. 15 is a diagram illustrating a hardware configuration of a controller.
Figure 16:
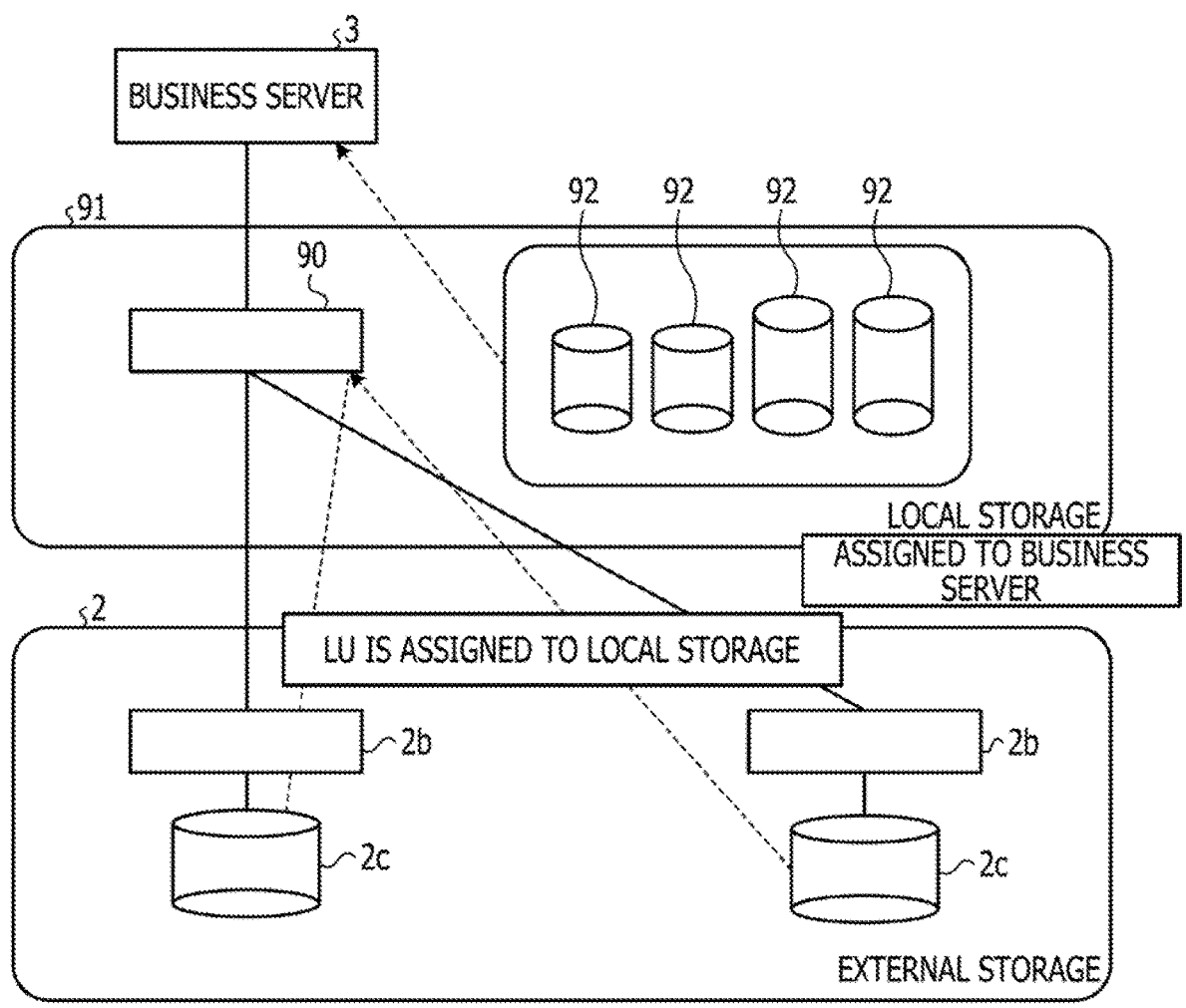
FIG. 16 is a diagram for explaining a storage virtualization system.

Next, a hardware configuration of the controller 10 will be described. FIG. 15 is a diagram illustrating the hardware configuration of the controller 10. As illustrated in FIG. 15, the controller 10 has a main memory 51, a central processing unit (CPU) 52 that is an example of a processor, a local area network (LAN) interface 53, and a hard disk drive (HDD) 54. Furthermore, the controller 10 also has a super input output (IO) 55, a digital visual interface (DVI) 56, and an optical disk drive (ODD) 57.

The main memory 51 is a memory that stores a program, a halfway result of execution of the program, and the like. The CPU 52 is a central processing unit that reads out and executes a control program from the memory 51. The CPU 52 includes a chipset having a memory controller.

The LAN interface 53 is an interface for connecting the controller 10 to another computer via a LAN. The HDD 54 is a disk device that stores programs and data, and the super IO 55 is an interface for connecting an input device such as a mouse and a keyboard. The DVI 56 is an interface for connecting a liquid crystal display device, and the ODD 57 is a device for reading and writing a DVD or CD-R.

The LAN interface 53 is connected to the CPU 52 by PCI Express (PCIe), and the HDD 54 and the ODD 57 are connected to the CPU 52 by Serial Advanced Technology Attachment (SATA). The super IO 55 is connected to the CPU 52 by Low Pin Count (LPC).

Then, a determination program that implements the functional units illustrated in FIG. 3 in the controller 10 is stored in a CD-R, which is an example of a recording medium that is readable by the controller 10, is read from the CD-R by the ODD 57, and installed in the controller 10. Alternatively, the determination program is stored in databases or the like of another computer system connected via the LAN Interface 53, read from these databases, and installed in the controller 10. Then, the installed determination program is stored in the HDD 54, read out to the main memory 51, and executed by the CPU 52.

As described above, in the embodiment, the RAID configuration storage unit 11 stores information of the virtual drive 21 included in the virtual RAID group 22. Furthermore, the virtual drive information storage unit 12 stores path information of every controller 10 for every virtual drive 21. Then, the determination unit 15 determines the recommended controller 10 for the virtual RAID group 22 based on the information stored in the RAID configuration storage unit 11 and the information stored in the virtual drive information storage unit 12. Then, when the excess value of the recommended controller 10 is "0", the determination unit 15 determines the recommended controller 10 as the responsible controller 10. Therefore, the controller 10 may determine the recommended path of the virtual RAID group 22.

Furthermore, in the embodiment, the determination unit 15 selects one or more recommended controllers 10 based on scores, and when there is a plurality of recommended controllers 10 having the same scores, the determination unit 15 selects one recommended controller 10 based on the number of other virtual RAID groups 22 for which it is responsible. Therefore, the controller 10 may appropriately determine the recommended controller 10.

Furthermore, in the embodiment, the determination unit 15 refers to the processing information storage unit 13, and when the excess value of the recommended controller 10 is larger than "0", the determination unit 15 determines another recommended controller 10 whose excess value is "0" as the responsible controller 10. Therefore, the controller 10 may reduce the responsible controller 10 from being overloaded.

Furthermore, in the embodiment, when an LU has been created in the virtual RAID group 22, the creation and deletion unit 16 updates the current processing value of the responsible controller 10 for the virtual RAID group 22 based on the number of created LUs. Then, the creation and deletion unit 16 requests the change processing unit 19 to perform change processing when the difference of the current processing value before and after the update is larger than a predetermined threshold value with respect to the excess value obtained by subtracting the processing capacity from the current processing value. Therefore, the controller 10 may change the responsible controller 10 upon creation of the LU.

Furthermore, in the embodiment, when an LU has been deleted from the virtual RAID group 22, the creation and deletion unit 16 updates the current processing value of the responsible controller 10 for this virtual RAID group 22 based on the number of deleted LUs. Then, when the excess value is larger than "0", or when the excess value is not larger than "0" and the difference of the current processing value before and after the update is larger than a predetermined threshold value, the creation and deletion unit 16 requests the change processing unit 19 to perform change processing. Therefore, the controller 10 may change the responsible controller 10 whose load has become low.

Furthermore, in the embodiment, when responsibility for the virtual RAID group 22 has been changed, the responsibility change unit 17 determines the current processing value of the responsible controller 10 before the change based on the number of LUs of the virtual RAID group 22 for which the responsibility has been changed. Then, when the excess value of the responsible controller 10 before the change is larger than "0", or when the excess value of the responsible controller 10 before the change is "0" and the difference of the current processing value before and after the update is larger than a predetermined threshold value, the responsibility change unit 17 requests the change processing unit 19 to perform change processing. Therefore, the controller 10 may change the responsible controller 10 whose load has become low.

Furthermore, in the embodiment, when responsibility for the virtual RAID group 22 has been changed, the responsibility change unit 17 updates the current processing value of the responsible controller 10 after the change based on the number of LUs of the virtual RAID group 22 for which the responsibility is changed. Then, when the difference of the current processing value before and after the update is larger than a predetermined threshold value with respect to the excess value obtained by subtracting the processing capacity from the current processing value, the responsibility change unit 17 requests the change processing unit 19 to perform change processing. Therefore, the controller 10 may change the responsible controller 10 upon change of responsibility for the LU.

Furthermore, in the embodiment, when a path to a virtual drive 21 has been lost, the loss recovery unit 18 updates the processing capacity of the responsible controller 10 for the virtual RAID group 22 including the virtual drive 21. Then, when the difference of the current processing value before and after the change is larger than a predetermined threshold value with respect to the excess value obtained by subtracting the processing capacity from the current processing value, the loss recovery unit 18 requests the change processing unit 19 to perform change processing. Therefore, the controller 10 may change the responsible controller 10 upon loss of path to the virtual drive 21.

Furthermore, in the embodiment, when a path to a virtual drive 21 has been recovered, the loss recovery unit 18 requests the change processing unit 19 to perform change processing when the excess value of the responsible controller 10 for the virtual RAID group 22 including this virtual drive 21 is larger than "0". Therefore, the controller 10 may change the responsible controller 10 upon recovery of path to the virtual drive 21.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A control device used in a storage system, the storage system including a virtual redundant array of inexpensive disks (RAID) group and a plurality of storage control devices, the virtual RAID group including a plurality of virtual drives, each of the plurality of storage control devices being coupled to at least one or more of virtual drives among the plurality of virtual drives, the control device comprising:
   a memory configured to store priority information for each of the plurality of virtual drives, wherein the priority information for each of the plurality of virtual drives indicates, for each of the plurality of storage control devices, a score corresponding to a priority of a path between that storage control device and that virtual drive; and
   processor circuitry coupled to the memory, the processor circuitry being configured to perform processing including:
   calculating, for each of the plurality of storage control devices, a total score by summing up each score for paths between each storage control device of the plurality of control devices and each of the plurality of virtual drives, the each score for the paths being obtained by accessing the priority information of the plurality of virtual drives; and
   determining, based on the calculated total score for each of the plurality of storage control device, a responsible storage control device to access the RAID group, the responsible storage control device being, among the plurality of storage control devices, a storage control device of which the total score indicates a higher priority than other storage control devices.

2. The control device according to claim 1, wherein the determining of the responsible storage control device includes
   selecting one or more recommended storage control devices by using a score based on the priority information stored in the memory, and when there is a plurality of recommended storage control devices having the scores that are same, selecting one recommended storage control device by using a number of other virtual RAID groups used for access, and determining the selected one recommended storage control device as the responsible storage control device.

3. The control device according to claim 2, wherein the determining of the responsible storage control device includes
selecting, when a current processing value of the selected one recommended storage control device exceeds a processing capacity, another storage control device by using the score, and
determining, when a current processing value of the other storage control device does not exceed the processing capacity, the other storage control device as the responsible storage control device.

4. The control device according to claim 3, the processing further comprising:
executing a creation and deletion processing configured to perform processing related to change of the responsible storage control device to the recommended storage control device in case at least either one of when a logical unit is created in the virtual RAID group or when the logical unit is deleted from the virtual RAID group;
executing a responsibility change processing configured to
perform processing related to change of the responsible storage control device to the recommended storage control device when responsibility for the virtual RAID group is changed; and
executing a loss recovery processing configured to
perform processing related to change of the responsible storage control device to the recommended storage control device when a path to a virtual drive is lost or when a path to a virtual drive is recovered.

5. The control device according to claim 4, wherein the creation and deletion processing is configured to,
in response that the logical unit is created in the virtual RAID group, update a current processing value of the responsible storage control device for the virtual RAID group based on a number of created logical units, and
perform processing related to change of the responsible storage control device to the recommended storage control device when a difference of the current processing value before and after the update is larger than a predetermined threshold value with respect to an excess value obtained by subtracting a processing capacity from the current processing value.

6. The control device according to claim 4, wherein the creation and deletion processing is configured to
in response that the logical unit is deleted from the virtual RAID group, update the current processing value of the responsible storage control device for the virtual RAID group based on a number of deleted logical units, and
perform processing related to change of the responsible storage control device to the recommended storage control device, in case at least either one of when the current processing value of the responsible storage control device exceeds the processing capacity, or when the current processing value of the responsible storage control device is less than or equal to the processing capacity and the difference of the current processing value before and after the update is larger than a predetermined threshold value.

7. The control device according to claim 4, wherein the responsibility change processing is configured to
in response that responsibility for the virtual RAID group is changed, update the current processing value of the responsible storage control device before the change by using a number of logical units of the virtual RAID group for which the responsibility is changed, and
perform processing related to change of the responsible storage control device before the change to the recommended storage control device, in case at least either one of when the current processing value of the responsible storage control device before the change exceeds the processing capacity, or when the current processing value of the responsible storage control device before the change is less than or equal to the processing capacity and the difference of the current processing value before and after the update is larger than a predetermined threshold value.

8. The control device according to claim 4, wherein the loss recovery processing is configured to
in response that a path to a virtual drive is lost, perform processing related to change of the responsible storage control device to the recommended storage control device, and
update the processing capacity of the responsible storage control device for the virtual RAID group including the virtual drive, when a difference of the current processing value before and after the update is larger than a predetermined threshold value with respect to the excess value obtained by subtracting the processing capacity from the current processing value.

9. The control device according to claim 4, wherein the loss recovery processing is configured to in response that a path to a virtual drive is recovered, perform processing related to change of the responsible storage control device to the recommended storage control device when the current processing value of the responsible storage control device for the virtual RAID group including the virtual drive exceeds the processing capacity.

10. A storage system comprising:
a virtual redundant array of inexpensive disks (RAID) group, the virtual RAID group including a plurality of virtual drives;
a plurality of storage control devices, each of the plurality of storage control devices being coupled to at least one or more of virtual drives among the plurality of virtual drives; and
a control device including:
a memory configured to store priority information for each of the plurality of virtual drives, wherein the priority information for each of the plurality of virtual drives indicates, for each of the plurality of storage control devices, a score corresponding to a priority of a path between that storage control device and that virtual drive; and
processor circuitry coupled to the memory, the processor circuitry being configured to perform processing including:
calculating, for each of the plurality of storage control devices, a total score by summing up each score for paths between each storage control device of the plurality of control devices and each of the plurality of virtual drives, the each score for the paths being obtained by accessing the priority information of the plurality of virtual drives, and
determining, based on the calculated total score for each of the plurality of storage control device, a responsible storage control device to access the RAID group, the responsible storage control device being, among the plurality of storage control devices, a storage control device of which the total score indicates a higher priority than other storage control devices.

11. A non-transitory computer-readable storage medium for storing a program of controlling a storage system including a virtual redundant array of inexpensive disks (RAID) group and a plurality of storage control devices, the virtual RAID group including a plurality of virtual drives, each of the plurality of storage control devices being coupled to at least one or more of virtual drives among the plurality of virtual drives, the program comprising instructions which, when the program is executed by a computer, cause a processor of the computer to perform processing, the processing comprising:

accessing priority information, the priority information being stored in a memory of the computer for each of the plurality of virtual drives, the priority information for each of the plurality of virtual drives indicates, for each of the plurality of storage control devices, a score corresponding to a priority of a path between that storage control device and that virtual drive;

calculating, for each of the plurality of storage control devices, a total score by summing up each score for paths between each storage control device of the plurality of control devices and each of the plurality of virtual drives, the each score for the paths being obtained by accessing the priority information of the plurality of virtual drives; and determining, based on the calculated total score for each of the plurality of storage control device, a responsible storage control device to access the RAID group, the responsible storage control device being, among the plurality of storage control devices, a storage control device of which the total score indicates a higher priority than other storage control devices.

* * * * *